United States Patent [19]
Zarudiansky

[11] 4,302,138
[45] Nov. 24, 1981

[54] REMOTE HANDLING DEVICES

[76] Inventor: Alain Zarudiansky, 22 rue Exelmans, 78140 Velizy, France

[21] Appl. No.: 5,560

[22] Filed: Jan. 22, 1979

[30] Foreign Application Priority Data

Feb. 1, 1978 [FR] France .................... 78 02714

[51] Int. Cl.$^3$ .................... B25J 3/00; B25J 21/02
[52] U.S. Cl. .................... 414/5; 3/1.1; 414/730
[58] Field of Search .................... 414/1, 2, 5, 6, 730; 3/1.1, 1.2

[56] References Cited

U.S. PATENT DOCUMENTS 3,509,583  5/1970  Fraioli .................... 414/5 X
3,535,711  10/1970  Fick .................... 414/5 X

FOREIGN PATENT DOCUMENTS 2376657  8/1978  France .................... 3/1.1

*Primary Examiner*—Trygve M. Blix
*Assistant Examiner*—Terrance L. Siemens

[57] ABSTRACT

In order to improve the grip and remote handling of an object by an "artificial hand" (or "slave hand") remotely controlled by the hand of an operator, the artificial hand is provided with sensors for sensing tactile parameters. The signals produced by these sensors are applied to actuators associated with a "master hand" in the form of a glove in which the hand of the operator is inserted, and the actuators apply tactile sensations to the hand of the operator. The operator thus apparently "feels" the object, as if handling it directly. The remote handling device of the invention is particularly useful for handling objects in a dangerous environment (in the nuclear or chemical industries for example) or out of the reach of the operator (under water or in space).

16 Claims, 11 Drawing Figures

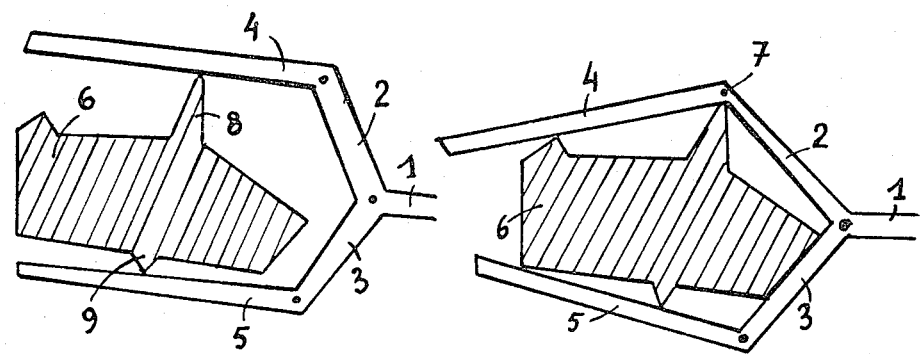
Fig. 1a  Fig. 1b  Fig. 1c
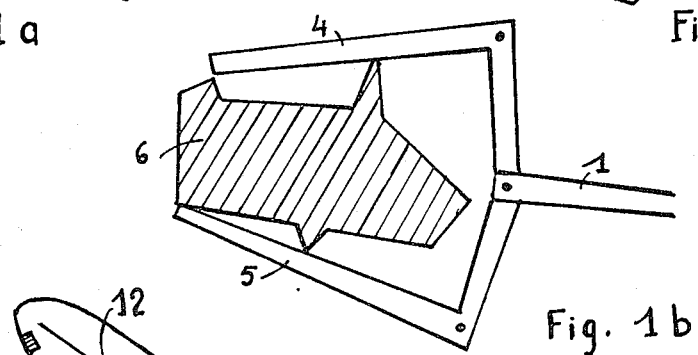
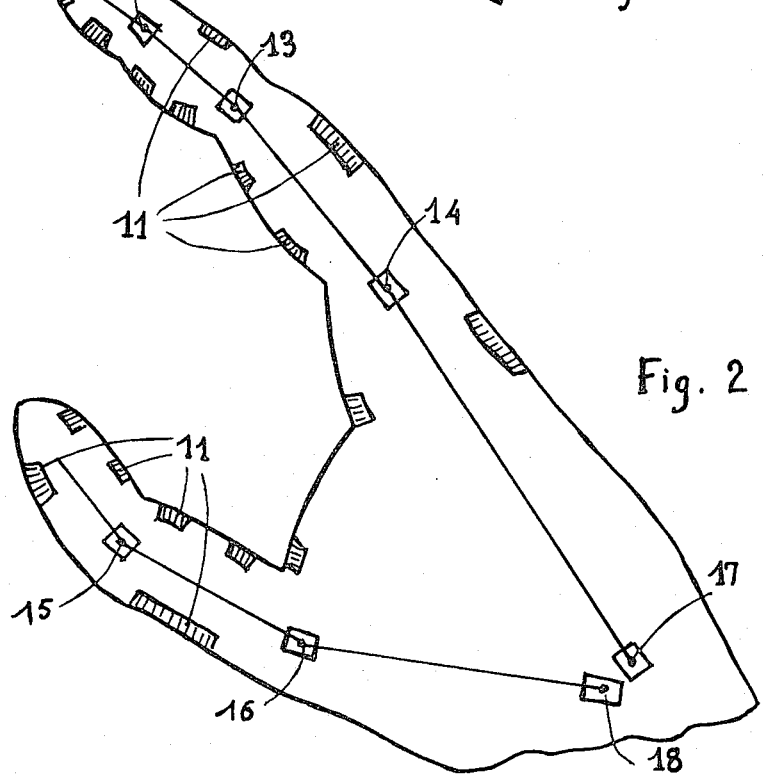
Fig. 2

REMOTE HANDLING DEVICES

The present invention relates to remote handling devices, intended for various industries, such as, for example, the chemical industry or the nuclear industry, with the object of handling objects disposed in a dangerous, or not directly accessible, environment. This type of device generally comprises, on one side of a partition delimiting the dangerous zone, a manipulating arm often called a "slave arm", and on the other side of the partition, an arm manipulated by the operator and generally called the the "master arm". Various mechanical or electromechanical means connect these two "arms" so as to reproduce with the slave arm the movements and positions of the master arm. In the most simple cases, the slave arm is formed by a gripping device constituted by two (or several) articulated elements, mounted on an arm driven so as to permit gripping to be effected in the positions and orientations necessary for the desired manipulations.

The known devices have a certain number of faults or deficiencies.

In general, the known devices permit, for the gripping device of the slave arm, a sufficiently faithful reproduction of the movements and the positions of the corresponding part of the master arm to be obtained, but these devices do not permit the faithful reproduction of the positions and movements for each of the articulated elements constituting the slave gripping device and which should reproduce exactly the positions and movements of the finger joints and articulations of the hand of the manipulator. As a result, the different parameters of the holding of the object by the gripping device (positions of each of the articulated elements of the gripping device with respect to the object) do not correspond to the respective positions which the articulations and finger joints of the hand of the manipulator would have if this latter were directly holding the object.

Once the object is positioned between the jaws, it is as a consequence difficult, if not impossible, to improve the grip on the object, other than by putting it down and recommencing the operation of taking hold. Likewise, it is difficult to modify the gripping characteristics (position of the points of contact and pressure force). In general, this type of manipulation is effected with visual control (direct or by television camera), and the gripping forces are either predetermined (forces, couples) or adjusted by reference to the indications of auxiliary control apparatus. In certain cases, where the slave arm is connected to the master arm by a reversible mechanical device, the action of the slave arm on the object being handled produces a reaction transmitted to the hand of the manipulator, permitting the latter to adjust the forces and couples as a function of the reaction felt. Because of attenuation and mechanical losses, the reaction felt lacks amplitude and fidelity and is not effective enough to permit the manipulator to adjust the forces and couples by action on the master arm. In the case of non-reversible electromechanical devices, there is no possibility of transmitting reactions to the manipulator, who has only the auxiliary control apparatus and the visual control for guidance. In the case where visual control is not possible for any reason, correct manipulation can only be obtained in certain very particular and limited cases.

The object of the present invention is to implement a handling device permitting the manipulator to adjust at any instant the holding and gripping parameters while eliminating the need of providing means for direct or indirect visual control and also any auxiliary control apparatus (measurement and display of forces, couples, positions, etc.).

The subject of the present invention is a device permitting the operator to handle an object by replacing the information received visually (visual control and information display) with tactile information received directly by the hand and permitting adjustment of gripping, holding and handling parameters by the use of human reflexes in conditions approaching a direct handling.

The handling device according to the present invention is principally distinguished by the fact that the slave arm comprises means for detecting certain useful parameters, such as for example force, pressure, couple, temperature, relating to the action of the slave arm on the object being handled, and individual control means acting separately on each of the articulated elements passing through the slave arm.

According to another characteristic of the present invention, the handling device comprises a master arm provided with elements capable of transmitting to the hand of the operator the parameters detected by the slave arm, in the form of actions either direct or amplified or attenuated, or even in the form of tactile representative signals; the master arm additionally comprising means for detecting the spatial position of each of the articulated elements constituting the hand of the operator and means for reproducing these spatial positions with the corresponding elements of the slave arm.

Other characteristics and advantages of the present invention will become apparent in the course of the following description, given by way of non-limitative example with reference to the accompanying drawings, of which:

FIGS. 1a, 1b and 1c show schematically three phases of the picking-up of an object by a simplified slave hand;

FIG. 2 illustrates schematically a slave hand of a handling device according to the invention;

Figure 3:
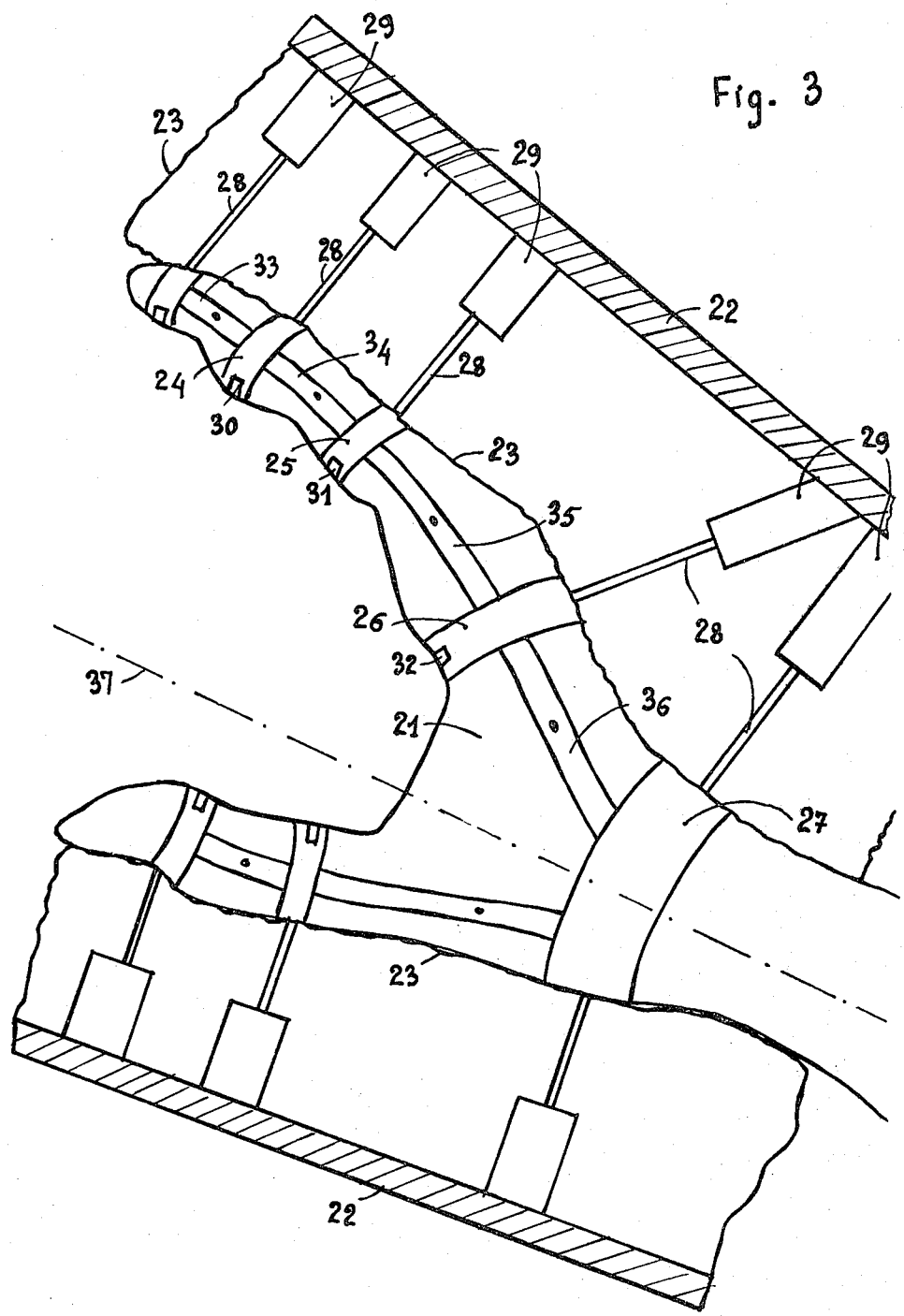
FIG. 3 illustrates schematically a master hand of a handling device according to the invention.

FIG. 1 shows schematically a simplified slave hand formed by an arm 1 provided with a gripping device formed by two articulated assemblies 2-4 and 3-5, the elements 4 and 5 being respectively in contact with projecting portions 8 and 9 of an object 6. It is evident that in the case of FIG. 1a, the grip, defining only two points of contact, is not optimum, and in the case of absence of visibility on the part of the operator, this latter does not know if the object 6 is or is not correctly held by the slave hand.

FIG. 1b shows the case where a better grip is obtained due to multiple contact of each of the elements 4 and 5 with the object 6.

FIG. 1c shows the case of the optimum grip in which each of the elements 2, 3, 4 and 5 is in contact with the object 6 in such a manner that the slave hand can manipulate the object 6, without risk of seeing the object drop, whatever the orientation of the forces or couples applied to it.

In the case of the human hand, the optimum grip is obtained, even without visibility, by a process combining the feeling phases, giving the operator information on the form of the object and on the reaction of the object to different probings, and the phases of gripping during which the different articulated elements of the hand adapt themselves to the object as a function of physical parameters connected with tactile sensations (which parameters will hereinafter be called "tactile parameters") and of the mechanical probings which must be applied to the object.

According to the present invention, the capacity of the human organism to react as a function of tactile sensations is put to use by detecting these sensations by the intermediary of sensors disposed on the slave hand, by applying the information thus sensed to the hand of the operator by the intermediary of "actuators" disposed on the master hand, and by reflecting the reactions of the human organism (hand of the operator) by the intermediary of sensors disposed on the master hand, which give instructions to actuators and positioners associated with the slave hand. Such a device permits the realisation of feeling and pick-up sequences which result in a grip on the object by a slave hand according to sequences analogous to those shown schematically by FIGS. 1a, 1b and 1c.

A more elaborate slave hand is schematically shown in FIG. 2 and comprises data sensing elements according to the invention. This slave hand, which can be implemented as a more or less simplified image of the human hand, is formed by articulated elements analogous to the elements of the human hand. At each of the articulation points angle sensors, represented schematically at 12, 13, 14, 15, 16, 17 and 18, are disposed, capable of producing signals representative of the angle between two articulated elements (finger joints for example) as well as actuators (not shown in the figure) capable of positioning these articulated elements in the desired position as a function of control signals received from the master hand. The sensors and actuators mentioned above can be of any type known in the technical field under consideration, the slave hand being capable of being implemented in a classic manner known in the field of remote handling devices. By way of example, the angle sensors and positioners can be of the type which will be described hereinafter. According to the present invention, the slave hand also comprises a plurality of sensors, represented schematically at 11, capable of producing signals representative of tactile parameters capable of being used to obtain data on the object to be manipulated and on the way in which this object is held by the slave hand. It should be noted that the sensors are not only distributed over the inside of the slave hand in contact with the object to be manipulated, but also over the lateral and external sides in contact with the environment of the object, which can be of great utility in the case of handling without visibility. In a particular case of simplification, the sensors of the lateral and external sides can transmit only a signal of contact between the slave hand and surrounding material walls.

By way of example, the sensors 11 are pressure sensors capable of measuring the local pressure exerted by the respective element of the slave hand under the effect of the contact of this element with the object being manipulated.

Preferably, each of the articulated elements (for example each finger joint) comprises two or more sensors, to permit a tactile exploration with a sufficiently great resolution to be obtained.

According to the present invention, the signals produced by the assembly of sensors are transmitted to corresponding actuators, which are disposed on the master hand and will be described with reference to FIG. 3. In the FIGURE, the human hand is schematically shown, that is to say the hand of the operator, introduced into the master hand which by way of example takes the form of a glove formed by a rigid external shell 22 connected to the human hand by a flexible shell 23 comprising means capable of connecting it to the articulated elements of the human hand. These connecting means can be constituted, for example, by rings such as those indicated at 24, 25 and 26 or by collars 27. Of course, the presence of the flexible shell 23 is not essential, the rings or collars can be supported by any mechanical means 28 connected to elements 29 which are actuators or positioners, themselves connected elsewhere to the rigid shell 22. These rings or collars permit the reproduction on the articulated elements of the human hand, with or without amplification or attenuation, of the forces or actions defined by the signals produced by the force or pressure sensors disposed on the slave hand.

In certain cases these rings or collars 24, 25, 26, 27 also comprise actuators which are schematically shown at 30, 31 and 32 and which are capable of applying to the skin of the human hand local stimuli in response to the signals emitted by the corresponding sensors of pressure and temperature of the slave hand.

Finally, to complete the description of the master hand, it is convenient to mention the position sensors having as their purpose to emit signals representative of the instantaneous spatial position of each of the articulated elements of the human hand, in order to permit the slave hand to reproduce these positions.

The position of the articulated elements of the human hand can be detected by displacement sensors disposed, for example, in association with the actuators 29 or even by angle sensors formed by the elements represented schematically at 33, 34, 35, 36 connected in pairs to the rings and collars and capable of providing signals representative of the angle formed by two consecutive finger joints articulated about the point represented at the centre of these elements 33, 34, 35, 36.

Of course, the device according to the invention also comprises sensors and actuators (not shown in the FIGURE) capable of defining the rotation of the elements of the human hand with respect to axes such as for example that shown at 37, and of exerting on the hand couples corresponding to the analogous couples of reaction exerted by the object being manipulated on the slave hand.

Figure 4:
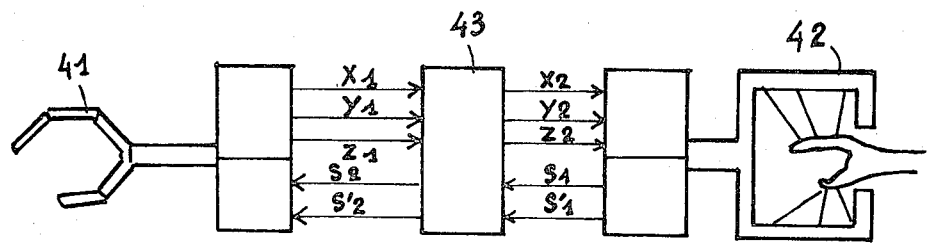
FIG. 4 illustrates schematically a complete handling device according to the invention.

FIG. 4 is a schematic representation of the assembly of a device according to the invention, intended to show the operation of this device according to the invention, which comprises a slave hand 41 and a master hand 42.

The slave hand 41 is essentially characterised by the fact that it comprises articulated elements of which the number depends on the complexity of the manipulations foreseen, but of which the general structure resembles that of a human hand, such that each articulated element has a corresponding element in the human hand. With each of these articulated elements is associated an actuating device capable, on the one hand, of positioning the element in space and, on the other hand, in the case of the application of this element against a part of an object, of applying to this object a determined force. This actuator is controlled by signals S2 derived from corresponding signals S1 from the master space after treatment by a data system 43. Each, or certain, of the articulated elements of the slave hand 41 comprise one or several sensors of parameters such as pressure, displacement, temperature, providing signals X, Y, Z representative of the interaction between the object being manipulated and the slave hand. These signals are applied to the inputs of the data processing system 43. The other part of the system according to the invention comprises the master hand 42 intended to receive the hand of an operator and comprising means for detecting the parameters representative of the position of the movable elements of the hand (finger joints etc). These means emit the signals S1 applied to the data processing system 43 which, after processing, emits the control signal S2 intended for the slave hand 41.

Also, the master hand comprises actuators receiving signals X2, Y2, Z2 (obtained by processing of the signals X1, Y1, Z1 by the apparatus 43); these actuators being capable of applying to the hand of the operator, inserted in the master hand, tactile sensations representative of the tactile parameters sensed at the level of the slave hand (pressure, force, temperature). It can therefore be seen that the system thus described comprises the transmission to the hand of the operator of tactile parameters sensed by the artificial hand called the slave hand and the transmission to the slave hand of orders tending to impose on this latter the movements applied by the hand of the operator to the artificial hand known as the master hand.

Thus, the operator receives tactile sensations, as if his hand were applied to the object being manipulated, and by reflex operates on the slave hand according to sequences combining imperical feeling and picking up of the object, which permits obtaining at a distance, a certain knowledge of the object being manipulated (shape, weight, resistance to pressure, temperature etc) and deducing from these the reflex movements having as their end the holding of the object and its manipulation for a predetermined purpose.

Of course in the most simple cases, the apparatus 43 can be omitted, supposing that the sensors provide a signal directly adapted for controlling the actuators. In more complicated cases, the apparatus 43 effects a true treatment of the data, for example to transform the signals to time averaged values, or to generate signals intended for a single actuator from signals produced by several sensors.

In another case, the apparatus 43 in fact comprises a telemetry system (cable, radio link, laser etc) permitting a manipulation at great distance, for example in the case where the slave part is disposed at the bottom of the sea or in a well in the earth or even in extra-terrestial space, while the master part is disposed on the earth in a tele-control station.

Of course, the system according to the invention does not exclude the utilisation of auxiliary control means, for example visual (direct or by television) which permits the manipulations to be rendered even more precise by the combination of the tactile sense with the visual sense.

Among the more interesting industrial applications, can be cited the problems of manipulating objects in bulk such as, for example, mechanical pieces stocked in bulk in cases near a production line. In this case, the problem is to provide a device permitting the picking up of these pieces in bulk and their disposition with a convenient orientation on tables or conveyors associated with the production line. For this particular application, it is possible to implement a manually controlled device, such as is described herein-above controlled by an operator.

According to the present invention, it is possible to implement an automatic device by using the system such as that described herein-above, in which the data processing apparatus 43 is in fact a computer programmed in the following fashion: in a first step, the device is used to effect the tactile exploration of the pieces to be manipulated under the control of a human hand: all the signals (positions, pressures etc) are recorded by the computer in the form of sequences of tactile exploration. The computer will therefore store in its memory the fundamental characteristics of the shape of the object in question and also the sequences of signals representative of the different ways in which the object can be encountered by the slave hand and the instructions necessary for all cases for putting the object felt into a predetermined orientation.

In a second step, the presence of the hand of the operator is no longer necessary since, thanks to the memory of the computer, the slave hand will be able to pick up the objects one after the other, and place them in the predetermined orientation.

The actuators used in the device according to the invention can be any means known in the mechanical or electromechanical fields and more particularly those utilised in the implementation of known handling devices. In particular elements of the moving core solenoid type, cabable of exerting forces and of moving the articulated elements of the operating hand can be used, and for the slave hand electric motor controls can be used, associated with a system of rods, permitting the adjustment of the mechanical parameters to be produced as a function of the electrical parameters of the motors.

As actuators capable of reproducing tactile sensations, devices reproducing the parameter detected (pressure for example) on a part of the hand of the operator can be used or even devices applying a signal representative of this parameter (for example an electrical impulse of which the amplitude or the frequency is a function of the value of the detected pressure). In fact, it is known that the human organism is capable of reacting correctly to such stimulations after several minutes or several hours of appropriate learning. The following figures show by way of example some embodiments of sensors capable of being used for the implementation of a handling system according to the invention.

Figure 5:
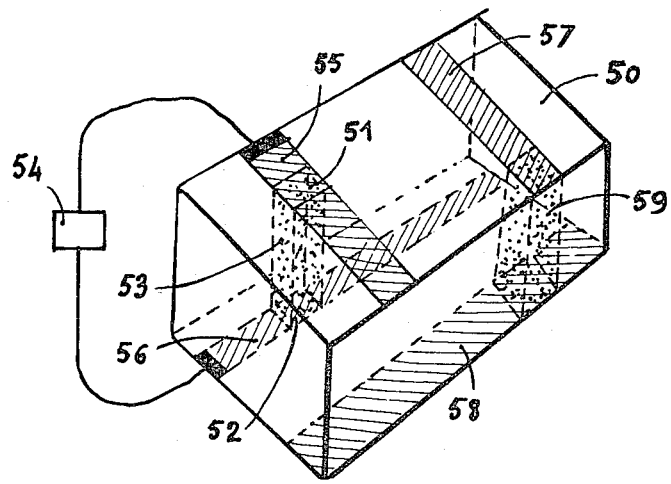
FIG. 5 illustrates schematically an example of a pressure and temperature sensor capable of being used to implement a slave hand according to FIG. 2.

FIG. 5 shows a sensor forming the matrix element of an artificial skin capable of covering the articulated elements making up the slave hand.

According to the present invention, a membrane 50 is used; the membrane being constituted by a flexible insulating material such as, for example, the synthetic materials known under the names "capton" and "silastene", or any material of the synthetic rubber type, capable of being doped (i.e. receiving a diffusion), by classical methods, with atoms, molecules or smaller or larger particles of electrically conductive materials. The diffusion of electrically conductive materials can be limited to certain portions of the volume of the material and can be of variable density according to the requirements. In particular, according to the present invention, certain problems of volume, such as the portion 53, include a diffusion such that the electrical resistance between the terminal surfaces 51 and 52 is a function of the force exerted on these surfaces 51 and 52. The element 51, 53, 52 thus constitutes a pressure sensor, variations of pressure being translated into variations of current flowing from a source of potential applied by means of electrodes 55 and 56, which are implemented for example by the deposition of metallic layers on the opposite surfaces of the material 50.

In other words, a matrix of pressure sensors can be obtained, disposed in the body of a layer of flexible material, by suitably doping certain portions of this layer and by connecting the terminal parts of said portions to sources of potential.

In the same layer of flexible material 50, temperature sensors can also be implemented, for example in the form of thermocouples or thermistances, constituted by a first metal deposited on one of the faces of the material 50 (electrode 57), a second metal deposited on the other face of the material 50 (electrode 58) and a conductive connection obtained by a suitable diffusion of electrically conductive material, effected in the volume portion 59.

Thus it can be seen that judicious distribution of electrically conductive material in the zones such as 53 and 59, associated with the deposition of metallic electrodes such as 55, 56, 57, 58 with a suitable choice of the metals used, permits a mosaic of sensors, some sensitive to pressure and others sensitive to temperature, to be obtained, the support of this mosaic being a flexible material capable of constituting an "artifical skin" suitable for use in apparatus according to the invention.

Figure 6:
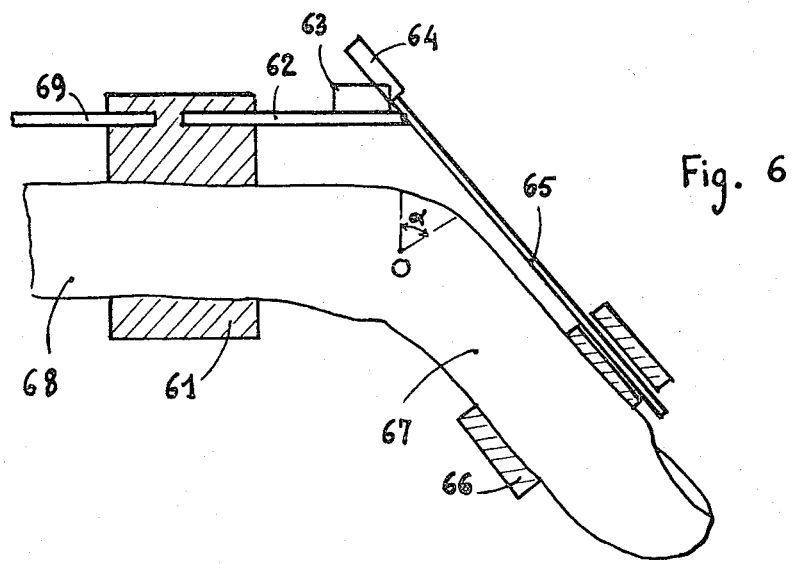
FIGS. 6, 7 8 and 9 illustrate schematically examples of embodiments of sensors capable of being used to implement the master hand illustrated in FIG. 3.

FIG. 6 shows schematically a finger equipped with an angle sensor formed by a ring 61 of which the upper part comprises a support 62 on which is fixed a variable inductance transducer constituted by a fixed solenoid 63 which co-operates with a movable magnetic core 64 (or electrical winding) fixed on a rod 65 connected to the rod 62 by a flexible or hinged joint. This rod 65 is connected, for example by a sliding contact, to a ring 66 disposed on the finger joint 67. Thus the angle between the finger joints 67 and 68 can be measured by the angle between the rods 62 and 65 by the measurement of the inductance (or mutual inductance) of the solenoid 63.

Figure 7:
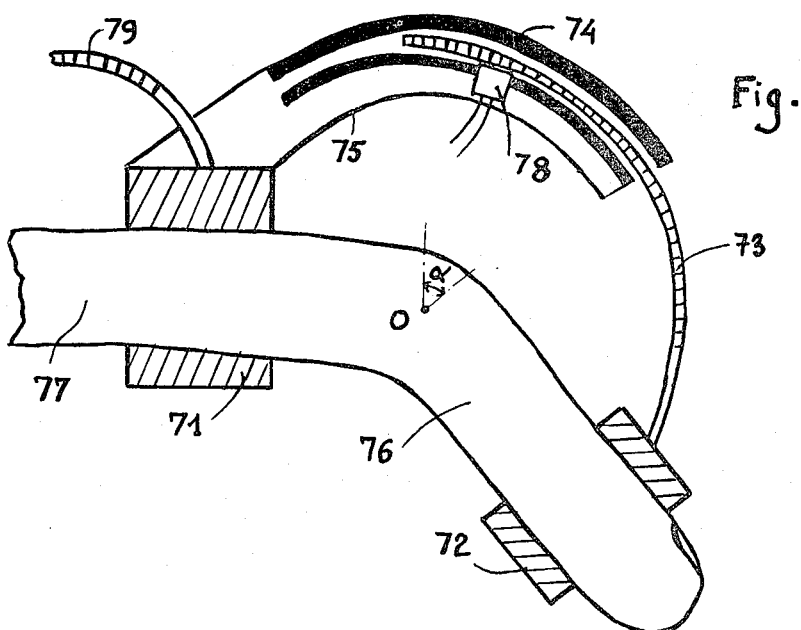

FIG. 7 shows another example of an angle sensor, formed by two rings 71 and 72. On one of the rings (72) is fixed a rod 73, in rigid material, or having a degree of flexibility, shaped like an arc of a circle and sliding in a guide (channel or groove) 74, disposed on a support 75 having the general form of a segment of a circle, fixed to the ring 71. These four elements 72, 73, 75 and 71 are implemented and disposed such that the centre of curvature of the elements 73 and 74 is substantially concentric with the centre O of rotation of the joint joining the finger joints 76 and 77. When this joint is bent, a magnetic, optical or other detector, fixed to the segment 75, detects appropriate reference marks disposed along the rod 73, and the analysis of the signals produced by this detector permits the measurement of the angle defined by the finger joints 76 and 77.

Of course, it is possible to compensate an eventual offset between the centre of curvature of the segment and the centre O of rotation of the joint, by for example making the rod 73 in a material having a certain flexibility.

Figure 8:
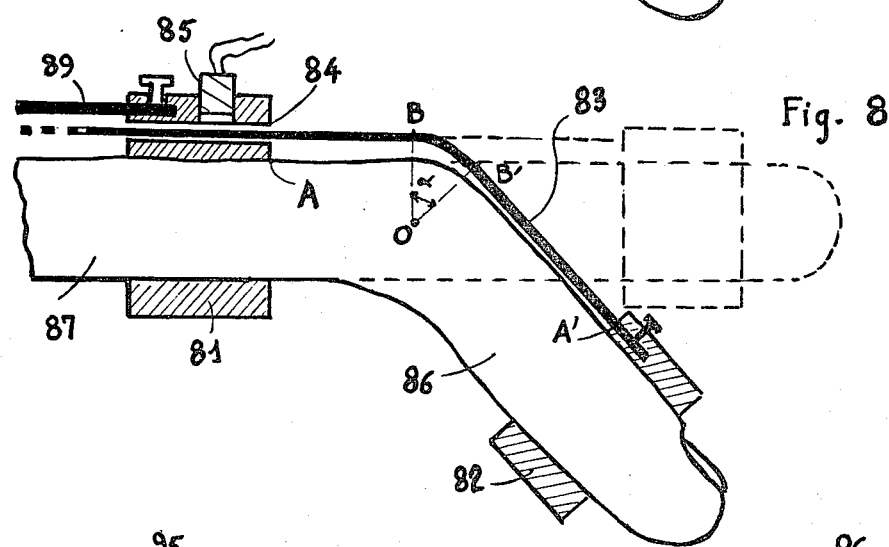

FIG. 8 shows a variant of the angle sensor, which comprises like the preceding ones, two rings 81 and 82. According to this variant, a flexible rod or blade, of which one end is free, slides in a bore 84 provided in the upper part of the ring 81. The flexing of the finger joint 86 with respect to the finger joint 87 produces an increase in the distance A—A'; this elongation B—B' is representative of the angle formed by the finger joints. According to the present variant, this elongation is detected by a magnetic or optical (or other) detector 85, disposed facing the rod 83 sliding in the bore 84 and capable of detecting magnetic, optical (or other) reference marks disposed on the rod 83 and passing in front of this detector.

Figure 9:
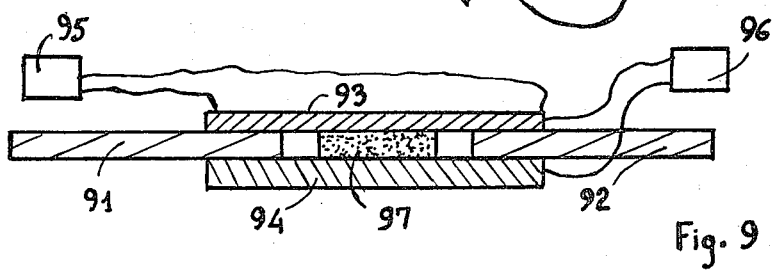

The rod 83 or the pair of elements 73 to 74 can also be replaced by a rod, shown in FIG. 9, comprising two relatively rigid parts 91, 92 connected by two flexible blades 93, 94 of which one constitutes an extensimeter made for example of an extensible material, of which the elongation can be measured by known means, such as, for example, the variations of electrical resistance of an associated electrical conductor, measured by a circuit shown schematically at 95. A signal representative of the flexing of the rod shown in FIG. 9 can also be obtained by detecting, by means of a detector shown schematically at 96, the electrical potential difference produced by the pressure exerted by the blades 93, 94 on a material, for example, a piezo-electric material 97 disposed between the blades 93, 94.

Of course, in the variants illustrated by FIGS. 6, 7, 8 and 9, a selected ring (for example 61, 71 or 81) can be used to maintain in position a blade or rod 69, 79, or 89 co-operating with a third fixed ring on the adjacent finger joint (not shown).

Additionally, it is evident that the angle detectors described hereinabove can be adapted, not only to measure the angle between two finger joints, but also to measure the angle between a finger joint and another portion of the hand of the operator or even to detect the rotation of the hand or the wrist with respect to a fixed axis.

I claim:

1. A device for remotely handling an object, the device comprising a gripping device formed by a plurality of articulated elements for reproducing, at least in part, the structure of a human hand; means for receiving the hand of an operator and including position detectors disposed to sense the instantaneous spatial position of the movable parts of the hand of the operator and to produce signals representative thereof; and a control device for controlling the instantaneous spatial position of said articulated elements in response to the signals produced by said receiving means, the control device being operative to reproduce, for each articulated element of the gripping device, the instantaneous position of the analogous moving part of the hand of the operator, wherein at least one of the said articulated elements is provided with at least one sensor for sensing a tactile parameter, and for providing signals representative thereof, whereby said tactile parameter representative signals are also representative of contacts of said articulated element with the object, and wherein the receiving means comprises actuator means for receiving said tactile parameter representative signals and applying to the hand of the operator sensations representative of said tactile parameter, wherein the actuator means comprises a plurality of actuators, and the receiving means comprises a support for supporting said actuators, and a plurality of members, such as rings or collars, for receiving respective movable parts of the hand of the operator, the actuators being connected between the support and respective ones of said receiving members.

2. A remote handling device according to claim 1, wherein at least one of said position detectors is connected to said support and to one of said receiving members in such a manner as to detect the position of the corresponding movable part of the hand of the operator with respect to the support.

3. A remote handling device according to claim 1, wherein at least one of said position detectors is connected to two of said receiving members in such a manner as to detect the relative positions of the corresponding parts of the hand of the operator.

4. A remote handling device according to claim 3, wherein said at least one position detector comprises an angle detector connected to two adjacent ones of said receiving members to provide a signal representative of the angle formed by the corresponding adjacent movable parts of the hand of the operator.

5. A remote handling device according to claim 4, wherein said angle detector comprises two relatively slidable elements, one of said elements bearing reference marks, and a sensor sensitive to said reference marks mounted on the other element so as to sense their relative positions, each element being connected to a respective one of said adjacent receiving members.

6. A remote handling device according to claim 4, wherein said angle detector comprises a flexible member of which one end is fixed to a first of said adjacent receiving members and the other end slides in an opening provided in the second of said adjacent receiving members, and a sensor for measuring the displacement of the flexible member in said opening.

7. A remote handling device according to claim 4, wherein said angle detector comprises a rod of which the ends are respectively connected to said adjacent receiving members and which comprises at least one flexible central part provided with a sensor sensitive to the curvature of said central part.

8. A remote handling device according to claim 7, wherein said sensor is of the extensimeter type.

9. A remote handling device according to claim 7, wherein said sensor is of the type employing materials sensitive to compression forces.

10. A remote handling device according to claim 4, wherein said angle detector comprises two coils each coupled to a respective one of said adjacent receiving members, and a sensor for sensing changes in the mutual inductance of said coils.

11. A remote handling device according to claim 4, wherein said angle detector comprises a coil connected to one of said adjacent receiving members, a core member disposed in the coil and connected to the other of said adjacent receiving members, and a sensor for sensing changes in the inductance of the coil.

12. A remote handling device according to claim 1, wherein said at least tactile parameter sensor comprise a pressure sensor, comprising two metallic electrodes arranged on opposite sides of a layer of synthetic elastic material having inclusion of electrically conductive substance to form a composite material, the electrical resistance of which is depending on the pressure applied to said composite material, the signals representative of the pressure being the variations of an electric current traversing the composite material between said electrodes.

13. A remote handling device according to claim 1, wherein said at least one tactile parameter sensor comprise a temperature sensor of thermocouple or thermistance type including a first metal plate, a second metal plate and electricity conducting means connecting said first and second plates, said electricity conducting means comprises a layer of synthetic elastic insulating material placed between said plates, a suitable electrically conductive substance being included in said material to provide conduction of electricity between said plates.

14. A remote handling device according to claim 1, wherein said at least tactile parameter sensor comprise at least one pressure sensor and at least one temperature sensor formed in a layer of a synthetic elastic insulating material having certain portion suitably doped with an electricity conductive material, said pressure sensor being formed by two metallic electrodes respectively disposed on both sides of said layer, the doping of the synthetic material placed between said electrodes being such that the electrical resistance thereof is a function of the pressure applied between said electrodes, said temperature sensor being of the thermocouple or thermistance type formed by two different metals deposited respectively on both sides of said layer of synthetic material, the doping of the material between said metals being such that permanent electric contact is provided between said metals.

15. A remote handling device according to claim 1 further comprising data processing means coupled to receive the tactile parameter signals and to apply them to the actuator means, said data processing means also being coupled between said position detectors and said control device, wherein said data processing means comprise means for analysing and recording signals corresponding to sequence of tactile exploration and manipulation of the object by the gripping device under the control of the hand of the operator, and means for automatically effecting sequences of tactile exploration and manipulation of the same object in the absence of the hand of the operator on the basis of the signals recorded during said sequences controlled by the hand of the operator.

16. A device for remotely handling an object, the device comprising: a gripping device formed of a plurality of articulated elements for reproducing, at least in part, the stucture of a human hand; means for receiving the hand of an operator and including position detectors disposed to sense the instantaneous spatial position of the movable parts of the hand of the operator and to produce signals representative thereof; and a control device for controlling the instantaneous spatial portion of said articulated elememts in response to the signals produced by said receiving means, the control device being operative to reproduce, for each articulated element of the gripping device, the instantaneous position of the analogous moving part of the hand of the operator, wherein at least one of said articulated elements is provided with at least one sensor for sensing a tactile parameter, and for providing signals representative thereof, whereby said tactile parameter representative signals are also representative of contacts of said articulated element with the object, and wherein the receiving means comprises actuator means for receiving said tactile parameter representative signals and applying to the hand of the operator sensations representative of said tactile parameter, wherein the actuator means comprises a plurality of actuators, and the receiving means comprises a support for supporting said actuators, and a plurality of members, such as rings and collars, for receiving respective movable parts of the hand of the operator, the actuators being connected between the support and respective ones of said receiving members, wherein said at least one tactile parameter sensor comprises a temperature sensor formed in the thickness of a synthetic elastic insulating material and formed by thermistances or thermocouples comprising a first metal deposited on one of the faces of the elastic material, a second metal deposited on the other face of the elastic material and an electrical conductor connecting these two metals, the conductor being produced by doping the elastic material present in the space between the first and second metal with a suitable electrically conductive substance.

* * * * *